(12) United States Patent
Wang et al.

(10) Patent No.: US 11,815,642 B2
(45) Date of Patent: Nov. 14, 2023

(54) ELASTIC FULL WAVEFIELD INVERSION WITH REFINED ANISOTROPY AND $V_P/V_S$ MODELS

(71) Applicant: ExxonMobil Technology and Engineering Company, Spring, TX (US)

(72) Inventors: Haiyang Wang, Spring, TX (US); Jacob A. Violet, Houston, TX (US); Olivier M. Burtz, Houston, TX (US); Partha S. Routh, Katy, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 921 days.

(21) Appl. No.: 16/593,492

(22) Filed: Oct. 4, 2019

(65) Prior Publication Data

US 2020/0132873 A1 Apr. 30, 2020

Related U.S. Application Data

(60) Provisional application No. 62/751,095, filed on Oct. 26, 2018.

(51) Int. Cl.
*G01V 1/50* (2006.01)
(52) U.S. Cl.
CPC .......... *G01V 1/50* (2013.01); *G01V 2210/626* (2013.01); *G01V 2210/6222* (2013.01);
(Continued)
(58) Field of Classification Search
CPC ............. G01V 1/50; G01V 2210/6222; G01V 2210/6224; G01V 2210/6226;
(Continued)

(56) References Cited

U.S. PATENT DOCUMENTS 7,072,767 B2 7/2006 Routh et al.
8,892,413 B2 11/2014 Routh et al.
(Continued)

FOREIGN PATENT DOCUMENTS

WO WO 2013/112466 A1 8/2013
WO WO 2014/189679 A1 11/2014

OTHER PUBLICATIONS

Guo et al., "A Hybrid Seismic Inversion Method for VP/VS Ratio and Its Application to Gas Identification", Pure Appl. Geophys. 175 (Mar. 16, 2018), 3003-3022 (Year: 2018).*
(Continued)

*Primary Examiner* — Regis J Betsch
(74) *Attorney, Agent, or Firm* — ExxonMobil Technology and Engineering Company—Law Department

(57) ABSTRACT

Methods for inversion of seismic data to infer subsurface physical property parameters, comprising constructing an inhomogeneous anisotropy model and/or inhomogeneous $V_S/V_P$ or $V_P/V_S$ model; and inverting the seismic data in a sequential or simultaneous approach to obtain at least one subsurface physical property parameter using an elastic inversion algorithm and the inhomogeneous anisotropy model and/or inhomogeneous $V_S/V_P$ or $V_P/V_S$ model. Constructing an inhomogeneous anisotropy model may comprise deriving geobodies from at least one of seismic facies analysis, regional geologic information, or seismically derived earth models; and adjusting at least one of $\varepsilon$, $\delta$, $\gamma$, or parameters of the elastic stiffness tensor matrix in a homogeneous anisotropy model in areas corresponding to the geobodies. Constructing an inhomogeneous $V_S/V_P$ or $V_P/V_S$ model may comprise deriving geobodies and adjusting values in a homogeneous $V_S/V_P$ or $V_P/V_S$ model in areas corresponding to the geobodies.

35 Claims, 11 Drawing Sheets

(52) U.S. Cl.
CPC ............... *G01V 2210/6224* (2013.01); *G01V 2210/6226* (2013.01); *G01V 2210/6242* (2013.01); *G01V 2210/675* (2013.01)

(58) Field of Classification Search
CPC ..... G01V 2210/6242; G01V 2210/626; G01V 2210/675
See application file for complete search history.

(56) References Cited

U.S. PATENT DOCUMENTS

| | | | |
|---|---|---|---|
| 9,285,491 B2* | 3/2016 | Bakker | G01V 1/28 |
| 9,495,487 B2 | 11/2016 | Krebs et al. | |
| 9,702,993 B2 | 7/2017 | Wang et al. | |
| 2003/0010494 A1* | 1/2003 | Bose | G01V 1/44 166/100 |
| 2011/0222370 A1 | 9/2011 | Downtown et al. | |
| 2014/0350861 A1* | 11/2014 | Wang | G01V 1/28 702/14 |
| 2017/0322331 A1* | 11/2017 | Roure | G01V 1/284 |

OTHER PUBLICATIONS

Aki and Richards, (1980) "Quantitative Seismology: Theory and Methods," Chapter 5.2, W. H. Freeman & Co., pp. 133-154.

Baumstein, A, et al. (2011) "Proceedings," Simultaneous Source Elastic Inversion of Surface Waves, $73^{rd}$ EAGE Conference & Exhibition incorporating SPE EUROPEC 2011, Vienna, Austria, May 23-26, 2011, 5pgs.

Emery et al. (2006) "Using V P /V S to explore for sandstone reservoirs: well log and synthetic seismograms from the Jeanne d'Arc basin, offshore Newfoundland", Jan. 1, 2006, pp. 1-20, Retrieved from the Internet: URL:https//www.crewes.org/ForOurSponsors/ResearchReports/2006/2006-08.pdf [retrieved on Feb. 19, 2020].

Hampson et al. (2005) "Simultaneous inversion of pre-stack seismic data," 75' Annual International Meeting, SEG, Expanded Abstracts, pp. 1633-1637.

Krebs et al. (2009) "Fast Full-Wavefield Seismic Inversion Using Encoded Sources," Geophysics, vol. 74, No. 6, pp. WCC177-WCC188.

Minkoff et al. (1995) "Estimating the Energy Source and Reflectivity by Seismic Inversion", The Rice Inversion Project, Inverse Problems, vol. 11, No. 2, pp. 383-395.

Mora, Peter (1988) "Elastic Wave-Field Inversion of Reflection and Transmission Data", Geophysics, vol. 53, No. 6, 1988, pp. 750-759.

Operto et al. (2013) "A Guided Tour of Multiparameter Full-Waveform Inversion with Multicomponent Data: From Theory to Practice", The Leading Edge, vol. 32, No. 9, pp. 936-947, XP055205818.

Prieux et al. (2013) "Multiparameter Full Waveform Inversion of Multicomponent Ocean-Bottom-Cable Data from the Valhall Field. Part 2: Imaging Compressive-Wave and Shear-Wave Velocities", Geophysical Journal International, vol. 194, No. 3, pp. 1665-1681.

Rutherford et al. (1989) "Amplitude-versus-Offset Variations in Gas Sands", Geophysics, vol. 54, No. 6 (Jun. 1989), pp. 680-688.

Sears et al. (2008) "Elastic Full Waveform Inversion of Multi-Component OBC Seismic Data", Geophysical Prospecting, vol. 56, No. 6, pp. 843-862.

Tarantola, A. (1984) "Inversion of Seismic Reflection Data in the Acoustic Approximation", Geophysics, vol. 49, No. 8, pp. 1259-1266.

Tarantola, A. (1988) "Theoretical Background for the Inversion of Seismic Waveforms Including Elasticity and Attenuation", Pure and Applied Geophysics: Pageoph, vol. 128, No. 1-2, pp. 365-399.

Thomsen, L. (1986) "Weak Elastic Anisotropy", Geophysics, Society of Exploration Geophysicists, US, vol. 51, No. 10, Oct. 1, 1986, pp. 1954-1966, XP002082613.

Viruex, J., and Operto, S. (2009) "Full-Waveform Inversion—an Overview of Full-Waveform Inversion in Exploration Geophysics", Geophysics, vol. 74, No. 6, p. WCC1-WCC26.

* cited by examiner

ELASTIC FULL WAVEFIELD INVERSION WITH REFINED ANISOTROPY AND $V_P/V_S$ MODELS

CROSS-REFERENCE TO RELATED APPLICATION

This application claims the benefit of U.S. Provisional Patent Application 62/751,095 filed Oct. 26, 2018 entitled ELASTIC FULL WAVEFIELD INVERSION WITH REFINED ANISOTROPY AND VP/VS MODELS, the entirety of which is incorporated by reference herein.

TECHNOLOGICAL FIELD

The present disclosure relates to the field of geophysical prospecting, including to prospecting for hydrocarbons, and more particularly, to seismic data processing. Specifically, aspects of the present disclosure relate to methods for seismic data inversion that incorporate an inhomogeneous anisotropy model.

BACKGROUND

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

An elastic earth model is typically parameterized by compressional wave velocity ($V_P$), shear wave velocity ($V_S$), and density ($\rho$), in addition to anisotropic parameters and attenuation of the medium. Anisotropic parameters are commonly referred to as Thomsen's parameters—$\delta$ (delta), $\epsilon$ (epsilon), and $\gamma$ (gamma)—which respectively reflect near-offset effects, long-offset effects, and S-wave effects.

Extracting earth model parameters from seismic data is commonly referred to as seismic inversion. One of the most commonly used approaches for inverting for earth parameters is linear inversion (e.g., Hampson (2012), Minkoff (1995), Routh (2006), Downton (2011)). In most of these implementations, the data is imaged using a kinematic model comprising velocity and anisotropy to generate image gathers or angle dependent stacks. Band-limited elastic properties are then inverted from the image gathers (commonly referred to as pre-stack AVO inversion) or from angle dependent stacks (also known as post-stack AVO inversion). A key aspect of these types of inversion is that the mapping of the band-limited elastic parameters to the amplitude part of the data is linear and, therefore, very tractable computationally. Since these methods are applied to post-imaged data, the errors from imaging need to be accounted for and/or data need to be conditioned to make the results meaningful. Nonetheless, these methods may produce acceptable results for parameters that are more sensitive to the near to conventional far offset (i.e., angle of incidence between 5° and 45°), such as P-impedance ($I_P$), S-impedance ($I_S$), and $V_P/V_S$ ratio. It may be challenging, however, for pre-stack and post-stack inversion schemes to provide reliable results with respect to a third parameter such as P-wave velocity ($V_P$) and density ($\rho$).

Due to computational advances and the ability to solve for the full wave equation (Aki (1980)), inversion for earth parameters has been proposed using Full Waveform Inversion ("FWI") (e.g., Tarantola (1984), Tarantola (1988), Sears (2008), Virieux (2009), Krebs (2009), Baumstein (2011), Routh (2014), Krebs (2016)). FWI is an approach to seismic data analysis and imaging that seeks to model earth parameters using amplitude and phase information from seismic waveforms, not only travel times as tomography and migration techniques. Specifically, FWI estimates a velocity model, or earth model in general, by minimizing the phase and amplitude mismatch between simulated and observed data. For example, a typical FWI algorithm may be generally described as follows: using a starting subsurface physical property model, synthetic seismic data are generated, i.e. modeled or simulated, by solving a wave equation using a numerical scheme (e.g., finite-difference, finite-element, etc.). The synthetic data are compared with the observed seismic data and using the difference between the two, an error or objective function is calculated (the objective function is a measure of the misfit between the simulated and observed data). Using the objective function, a modified subsurface model is generated which is used to simulate a new set of synthetic seismic data. This new set of synthetic seismic data is compared to the field data to generate a new objective function. This process is repeated until the objective function is satisfactorily minimized and the final subsurface model is generated. Earth parameters may be reconstructed individually by single-parameter FWI or simultaneously by multi-parameter FWI.

A global or local optimization method may be used to minimize the objective function and to update the subsurface model. For example, a local cost function optimization procedure for FWI may involve: (1) selecting a starting model; (2) computing a search direction; and (3) searching for an updated model that is a perturbation of the model in the search direction. The cost function optimization procedure may be iterated by using the new updated model as the starting model for finding another search direction, which may then be used to perturb the model in order to better explain the observed data. The process may continue until an updated model is found that satisfactorily explains the observed data. Commonly used local cost function optimization methods include gradient search, conjugate gradients, quasi Newton, Gauss-Newton and Newton's method. Commonly used global methods include Monte Carlo, simulated annealing, genetic algorithms, evolutionary algorithms, particle based optimization, or grid search.

The most common form of the wave equation used in FWI is the variable density acoustic wave equation, which assumes no S-waves. Acoustic FWI may be appropriate in many cases because it is usually sufficient to consider only P-wave propagation to save processing time. In such scenarios, modeling of wave propagation depends only on density $\rho$ and $V_P$, as it is well known that PP reflection (P-wave down/P-wave up) at normal incident angle is largely determined by the acoustic impedance $I_P = \rho V_P$. However, acoustic impedance $I_P$ alone is not always a good indicator of reservoir rocks and types because fluid types can be better retrieved from elastic parameters such as $V_P/V_S$. As a result, multi-parameter elastic FWI approaches to invert for $I_P$ and $V_P/V_S$ have been proposed. For example, Wang et al. (2017) propose an approach that decomposes data into offset or angle groups and performs elastic FWI on them in sequential order. Their approach utilizes the relationship between reflection energy and reflection angle, or equivalently, offset dependence in elastic FWI. For example, their approach may be implemented by extracting only PP-mode data from seismic data, and inverting the PP-mode data sequentially in two or more different offset ranges, each offset range inversion determining at least one physical property parameter, wherein in a second and subsequent inversions, parameters determined in a previous inversion are held fixed. Physical parameters include, but are not limited to, $V_P$, $V_S$, and $\rho$.

The ability to simulate elastic waves in the subsurface and match the seismic data at near, mid, far, and ultra-far (i.e., beyond 45°) offsets provides the opportunity to extract more detailed subsurface properties. However, the amplitude of the data at far and ultra-far offsets not only depends on the elastic parameters of the medium, but also on anisotropy and attenuation. Unfortunately, existing elastic FWI approaches rely on conventional anisotropy models obtained from imaging that are typically low-frequency (spatially smooth) and do not show inhomogeneous variations in anisotropy such as layer to layer contrasts or geobody contrasts. Consequently, the inverted $V_P$ results tend to be contaminated by anisotropy effects. The need exists, therefore, for an approach that effectively takes into account crosstalk between $V_P$ and anisotropy in elastic FWI in order to fit the amplitude data at large offsets.

SUMMARY

The present disclosure provides methods for incorporating an inhomogeneous anisotropy model in seismic inversion. In some embodiments, the inhomogeneous anisotropy model may be incorporated in elastic FWI to improve the stability and accuracy of inversion for a third parameter such as $V_P$ and/or $\rho$. Alternatively, the inhomogeneous anisotropy model may be used to invert for multiple parameters simultaneously.

The present disclosure also provides computer-implemented methods for inversion of seismic data to infer subsurface physical property parameters, including any one of P-wave velocity $V_P$, S-wave velocity $V_S$, density, lambda, mu, and combinations thereof. One method comprises constructing an inhomogeneous anisotropy model; and inverting the seismic data in a sequential or simultaneous approach to obtain at least one subsurface physical property parameter using an elastic inversion algorithm and the inhomogeneous anisotropy model. Another method comprises constructing an inhomogeneous anisotropy model and an inhomogeneous $V_S/V_P$ or $V_P/V_S$ model; and inverting the seismic data in a sequential or simultaneous approach to obtain at least one subsurface physical property parameter using an elastic inversion algorithm and the inhomogeneous anisotropy model and the inhomogeneous $V_S/V_P$ or $V_P/V_S$ model. A third method comprises constructing an inhomogeneous $V_S/V_P$ or $V_P/V_S$ model; and inverting the seismic data in a sequential or simultaneous approach to obtain at least one subsurface physical property parameter using an elastic inversion algorithm and the inhomogeneous $V_S/V_P$ or $V_P/V_S$ model.

Constructing an inhomogeneous anisotropy model may comprise deriving geobodies from at least one of seismic facies analysis, regional geologic information, or seismically derived earth models; and adjusting at least one of $\varepsilon$, $\delta$, $\gamma$, or parameters of the elastic stiffness tensor matrix in a homogeneous anisotropy model in areas corresponding to the geobodies. For example, where the geobodies are sand geobodies, $\varepsilon$ and $\delta$ may be adjusted to be less than or equal to zero. Constructing an inhomogeneous $V_S/V_P$ or $V_P/V_S$ model may comprise deriving geobodies from at least one of seismic facies analysis, regional geologic information, or seismically derived earth models; and adjusting values in a homogeneous $V_S/V_P$ or $V_P/V_S$ model in areas corresponding to the geobodies. For example, where the geobodies are sand geobodies, areas corresponding to sand may be assigned lower $V_P/V_S$ values if constructing a $V_P/V_S$ model, or assigned higher $V_S/V_P$ values if constructing a $V_S/V_P$ model.

According to certain aspects of the present disclosure, using an elastic inversion algorithm may comprise extracting only PP mode data from the seismic data; inverting the PP mode data sequentially in two or more different offset ranges, each offset range inversion determining P-wave impedance ($I_P$) and at least one of S-wave impedance ($I_S$), P-wave velocity over S-wave velocity ($V_P/V_S$), S-wave velocity over P-wave velocity ($V_S/V_P$), and S-wave velocity ($V_S$), wherein in a second and subsequent inversions, parameters determined in a previous inversion are held fixed; and using the inverted subsurface physical property parameters to construct the inhomogeneous anisotropy model. In some embodiments, a near-offset range may be sequentially first to be inverted to infer $I_P$, using a computer programmed with an acoustic or elastic inversion algorithm. A mid-offset range may be sequentially second to be inverted to infer at least one of $I_S$, $V_P/V_S$, $V_S/V_P$, and $V_S$, with $I_P$ fixed at its value from the first inversion, said second inversion using an elastic inversion algorithm. Inverting the seismic data may be performed in a sequential approach comprising inverting a far-offset range to infer density or $V_P$, using an elastic inversion algorithm, with $I_P$ fixed at its value from the inversion of the near-offset range and $I_P$ or $V_P/V_S$ or $V_S/V_P$ or $V_S$ fixed at its value from the inversion of the mid-offset range. The inversions of the near-offset data, mid-offset data, and far-offset data may be repeated at least one time to update the inferred physical property parameters. In some embodiments, the acoustic and elastic inversion algorithms are full waveform inversion algorithms.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
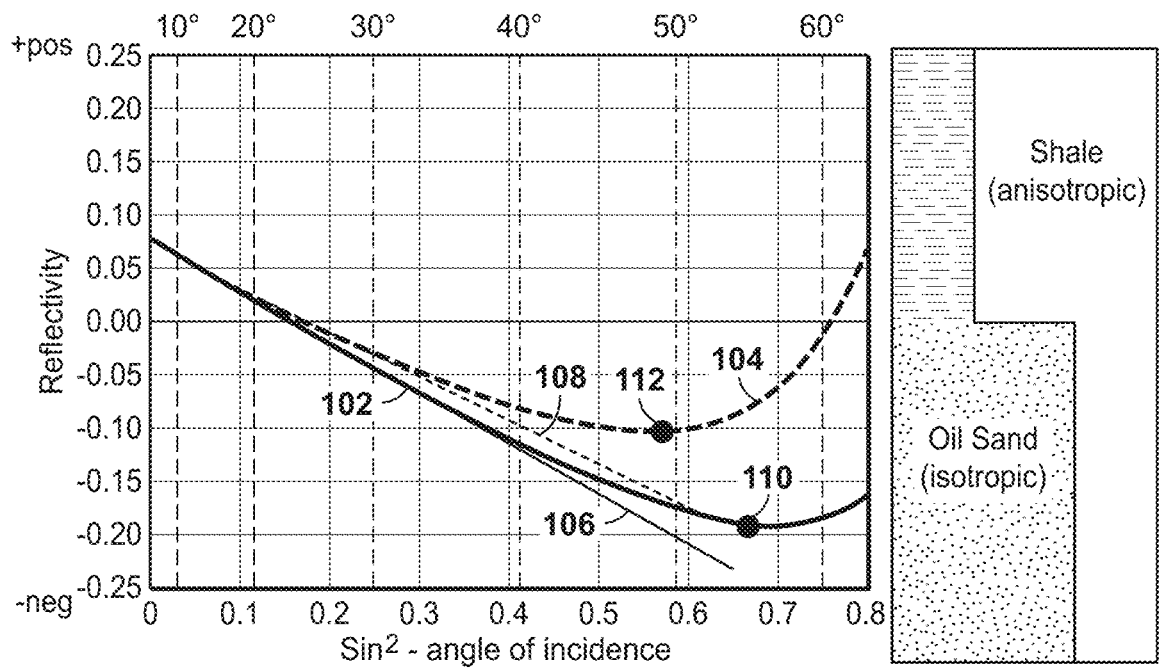
FIG. 1 is an exemplary chart showing the anisotropy effect on AVA.

It should be noted that the figures are merely examples and no limitations on the scope of the present disclosure are intended thereby. Further, the figures are generally not drawn to scale, but are drafted for purposes of convenience and clarity in illustrating various aspects of the disclosure. Certain features and components therein may be shown exaggerated in scale or in schematic form and some details of conventional elements may not be shown in the interest of clarity and conciseness. When describing a figure, the same reference numerals may be referenced in multiple figures for the sake of simplicity.

DETAILED DESCRIPTION

To promote an understanding of the principles of the disclosure, reference will now be made to the features illustrated in the drawings and no limitation of the scope of the disclosure is hereby intended by specific language. Any alterations and further modifications, and any further applications of the principles of the disclosure as described herein are contemplated as would normally occur to one skilled in the art to which the disclosure relates.

The amplitude of seismic data at far and ultra-far offsets not only depends on the elastic parameters of the medium, but also on anisotropy and attenuation. To illustrate the significance of anisotropy effects, reference is made to FIG. 1, which shows the Amplitude Versus Angle (AVA) response at the top of an exemplary class 2P oil reservoir. In particular, reflectivity is plotted against Angle of Incidence, with curve 102 corresponding to the AVA response in the case of an anisotropic shale ($\varepsilon$=0.12, $\delta$=0.06)/isotropic sand interface and curve 104 corresponding to the AVA response in the case of an isotropic shale ($\varepsilon$=$\delta$=0)/isotropic sand interface. It can be appreciated from FIG. 1 that the difference between anisotropic and isotropic cases is negligible below about 30°, but very significant beyond about 40°. However the slope and intercept of the AVA below 30° are only controlled by contrast in $I_P$ and $V_P/V_S$ ratio; there is no effect of $V_P$ contrast alone. Also shown are the intercept-gradient 2-term approximations of curves 102 and 104, respectively, as lines 106 and 108. The curvature difference between 106 and 102 or 108 and 104 is controlled by the $V_P$ contrast between sand and shale. The curvature effect is only noticeable for angles beyond about 45°-50°. The critical angle (i.e., the angle at which the wavefield changes from reflection to refraction) for the anisotropic and isotropic curves is shown at 110 and 112, respectively. The value of the critical angle is also controlled by the $V_P$ contrast between shale and sand. Therefore, it is evident that, to obtain accurate inversion results for parameters such as $V_P$, one must use data corresponding to angle beyond 45° where the anisotropy contrast should not be neglected.

Aspects of the technological advancement described herein incorporate higher resolution anisotropy in seismic inversion, particularly elastic FWI, to take into account non-smooth anisotropy variations in the subsurface. Benefits of the disclosed approaches include the ability to obtain improved physical property models by decoupling the effects of anisotropy in the amplitude component of the seismic data. In this context, the terms velocity model, earth model, or physical property model refer to an array of numbers, typically a three-dimensional array, where each number, which may be called a model parameter, is a value of velocity or another physical property in a cell, and where a subsurface formation has been conceptually divided into discrete cells for computational purposes. Non-limiting examples of such physical properties or model parameters include P-wave impedance $I_P$, S-wave impedance $I_S$, P-wave velocity $V_P$, S-wave velocity $V_S$, P-wave velocity divided by S-wave velocity ($V_P/V_S$), S-wave velocity divided by P-wave velocity ($V_S/V_P$), density $\rho$, $\lambda$ (lambda), and $\mu$ (mu).

According to some aspects of the present disclosure, an inhomogeneous anisotropy model may be constructed based on interval anisotropy variations or anisotropy contrasts in the subsurface, such as geobodies. Specifically, in some embodiments, three-dimensional sand geobodies may be used to update conventional low-frequency imaging anisotropy models. Sand geobodies may in turn be constructed using seismic facies analysis, regional geologic knowledge, or seismically derived earth models such as $I_P$ and $V_P/V_S$ (or $V_S/V_P$) or Volume-of-Shale cubes. For example, it is known that sand layers are much more isotropic ($\varepsilon$ and $\delta$≤0) than background shale (c may range from 0.05 to 0.3). However, the anisotropy of the earth has much less influence on the seismic data at lower angles. Therefore, according to some aspects of the present disclosure, $V_P/V_S$ and $I_P$ volumes may be derived from elastic FWI or conventional migration and used to guide the construction of the sand geobodies directly or in conjunction with the regional geological information, any available seismic facies information, and horizon interpretation.

Having constructed sand geobodies, low-frequency imaging anisotropy models may then be updated by adjusting the value of at least one of $\varepsilon$, $\delta$, $\gamma$, or parameters of the elastic stiffness tensor matrix in an anisotropy model in areas corresponding to the geobodies. For example, $\varepsilon$ and $\delta$ may be set to $\varepsilon$≤0 and $\delta$≤0 (and optionally $\gamma$ may also be set to $\gamma$≤0) in areas corresponding to the sand geobodies, thereby obtaining higher-resolution anisotropy cubes. The low-frequency anisotropy models may be obtained by any method known in the art (e.g., anisotropy tomography, or conventional velocity analysis to generate anisotropy models to flatten gathers). The higher resolution anisotropy model may correspond to sand, carbonate, or other lithology whose anisotropy is different from the background. A high-cut filter may be optionally applied to the resulting cubes to avoid sharp edge effects. In this regard, a 6 Hz high-cut may be sufficient, but cuts at higher frequencies may be required for higher frequency elastic FWI (the high-cut frequency preferably should be the maximum frequency expected to be retrieved by the elastic FWI).

The inhomogeneous anisotropy model may then be incorporated into seismic data inversion, including according to some embodiments described below. For example, the derived anisotropy model may be used in the elastic FWI simulation to explain the data typically at the far and ultra-far offsets. It should be understood that, while some exemplary workflows are described below, it is contemplated that an inhomogeneous anisotropy model may be incorporated into single-parameter and multi-parameter inversion schemes, including acoustic and elastic FWI, as appropriate.

Figure 2:
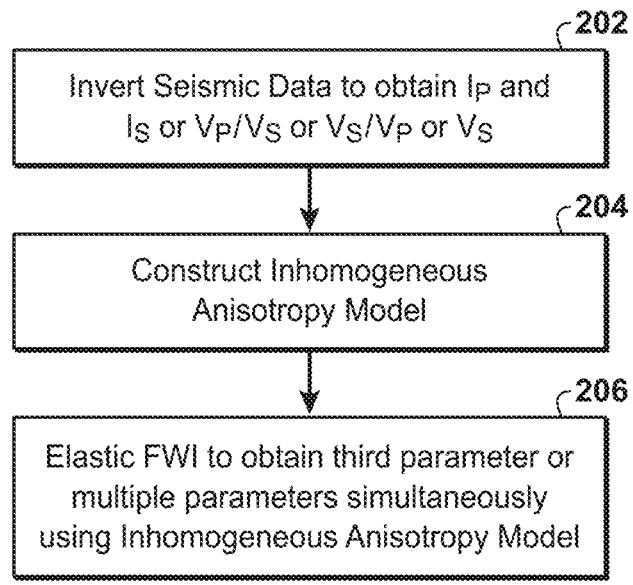
FIG. 2 is a flow chart showing basic steps of one embodiment of seismic data processing methods according to the present disclosure.

With reference to FIG. 2, a flow chart is provided showing basic steps in one embodiment of methods of the present disclosure. Specifically, at step 202, the method may begin by inverting seismic data to infer P-wave impedance ($I_P$) and at least one of S-wave impedance ($I_S$), P-wave velocity over S-wave velocity ($V_P/V_S$), S-wave velocity over P-wave velocity ($V_S/V_P$), and S-wave velocity ($V_S$). This may be done using conventional migration or elastic FWI. For example, one elastic FWI sequential approach may involve extracting only PP mode data from the seismic data. The PP mode data may be inverted sequentially in two or more different offset ranges, each offset range inversion determining at least one physical property parameter, wherein in a second and subsequent inversions, parameters determined in a previous inversion are held fixed. For instance, the PP mode data may be divided into near-offset range, a mid-offset range, and a far-offset range, which ranges may or may not overlap. The near-offset data may be inverted using an acoustic inversion algorithm to obtain a first parameter (e.g., $I_P$), and the mid-offset data may be inverted using an elastic inversion algorithm to obtain a second parameter (e.g., $V_P/V_S$), with the first parameter held fixed from the previous step. In certain embodiments, the near-offset range might be <500 m with the far-offset range being >2 km, and the mid-offset range being in between.

At step 204, an inhomogeneous anisotropy model may be constructed using the physical parameters derived in step 202 (e.g., $I_P$ and $V_P/V_S$ volumes obtained from near-offset and mid-offset data using elastic FWI). It should be understood, however, that this is only one possible embodiment and the present disclosure contemplates embodiments in which step 202 is omitted and an anisotropy model is constructed on the basis of seismic facies analysis or regional geologic knowledge alone, for example.

Next, at step 206, the inhomogeneous anisotropy model may be incorporated into elastic FWI inversion as described above to infer one or more earth model parameters. For example, in embodiments where a first and second parameter have been previously obtained (e.g., $I_P$ and $V_P/V_S$) to use in constructing the anisotropy model, the sequential elastic FWI approach may continue to invert the far-offset range of seismic data, using an elastic inversion algorithm, for a third parameter, which can be any of $V_P$, $V_S$, $V_P/V_S$, $V_S/V_P$, density ρ, λ (lambda), μ (mu), with any parameters obtained previously held fixed. For instance, the far-offset range may be inverted for $V_P$ or density ρ with $I_P$ and $V_P/V_S$ fixed. If one of $V_P$ or density ρ is obtained, the other may be computed using $I_P$ and the definition of acoustic impedance $I_P=\rho V_P$. Similarly, if one of $V_s$ or density ρ is obtained, the other may be computed using $I_s$ and the definition of acoustic impedance $I_S=\rho V_S$. Model parameters may also be continuously updated using the following equations:

$$\frac{\rho_{updated}}{\rho_{model}} = \frac{I_{P\ updated}}{I_{P\ model}} - \frac{V_{P\ updated}}{V_{P\ model}} \quad (1)$$

$$\frac{\rho_{updated}}{\rho_{model}} = \frac{I_{S\ updated}}{I_{S\ model}} - \frac{V_{S\ updated}}{V_{S\ model}} \quad (2)$$

Alternatively, at step 206, multi-parameter inversion may be performed simultaneously using elastic FWI. (See e.g., Wang et al. (2017); Sears (2008); Prieux (2013); Mora (1988); Operto (2013)).

Optionally, during iterations to invert for a third parameter or perform simultaneous inversion of multiple parameters in step 206 incorporating the inhomogeneous anisotropy model, the anisotropy model may also be used to check image gathers and adjust if the gather alignment degrades. Specifically, the kinematic information in the far and ultra-far offset data is strongly dependent on the P-wave velocity and anisotropy of the subsurface. Accordingly, the alignment of the image gathers obtained via migration with the higher resolution anisotropy model may provide a check on the integrity of the kinematic information, for example. This may be particularly necessary if sand geobodies are relatively thick (i.e., >100 m).

Figure 3A:
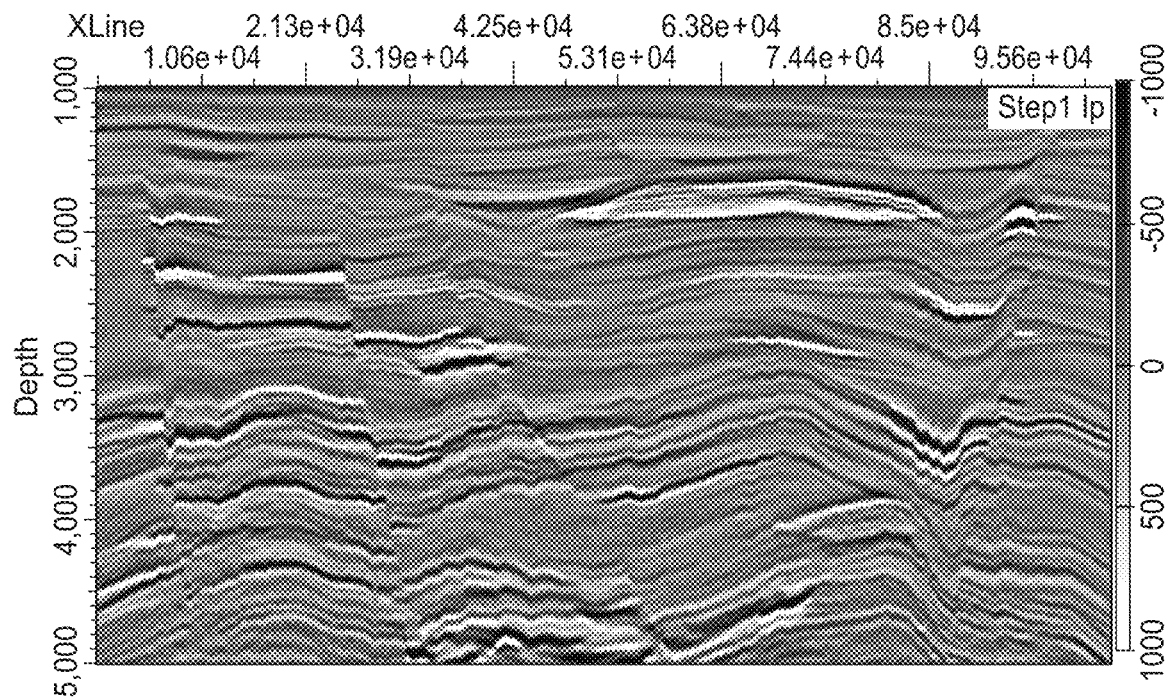
FIG. 3A is an exemplary $I_P$ model.
Figure 3B:
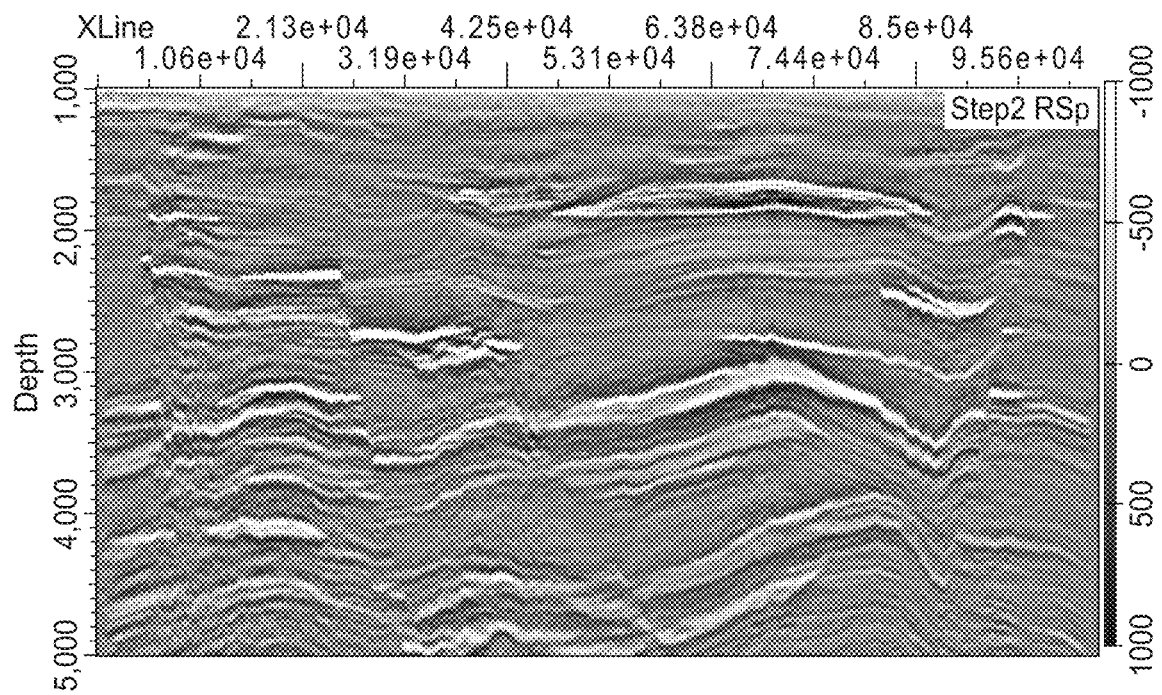
FIG. 3B is an exemplary $V_S/V_P$ model.

With reference to FIGS. 3A-3H, an example is provided to demonstrate some advantages of the method described in FIG. 2. Synthetic (computer simulated) data was used in this test example to demonstrate aspects of the technological advancement described herein. The simulation of the data was carried out using full elastic wave physics where the elastic parameters of the subsurface such as $V_P$, $V_S$, density and anisotropy are input to generate the synthetic data. Full elastic synthetic data were created as shots and used for inversion tests. The $I_P$ and $V_S/V_P$ models obtained by inverting PP data up to 45° offset angles in a sequential FWI approach are shown in FIG. 3A and FIG. 3B, respectively. Specifically, near-offset data was inverted to obtain $I_P$ using an acoustic wave equation; $I_P$ was then held constant to invert mid-offset data to obtain $V_S/V_P$. Several iterations in the order of tens may be needed to obtain a good fit to the shot data and estimate $V_S/V_P$ model. Also, initial $V_P$ and density models are needed to perform acoustic FWI. The initial $V_P$ model can be derived from traditional migration velocity analysis, and for this synthetic test, a smoothed version of the "true" $V_P$ profile (used to forward model the synthetic data) was used. The initial density model can be derived from the empirical relationship between density and $V_P$. For simplicity, a constant density (e.g. 1000 kg/m$^3$) model can also be used.

Figure 3C:
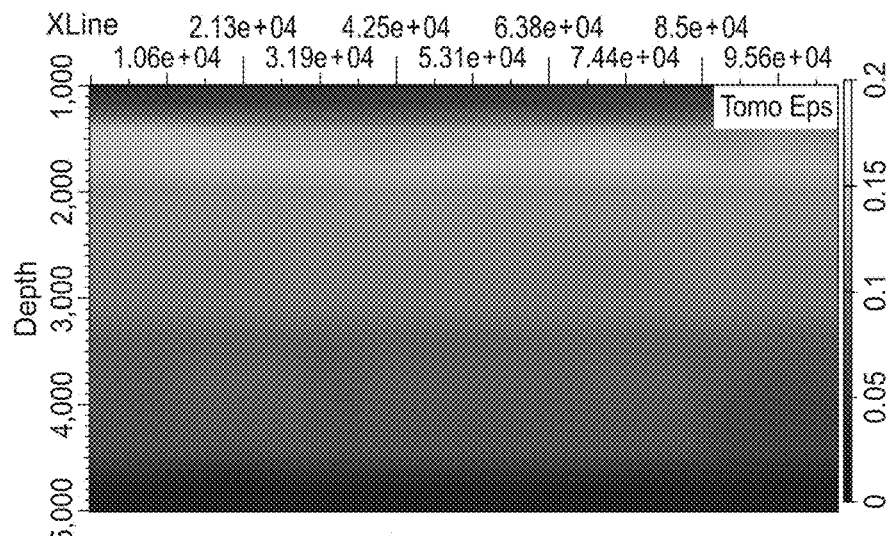
FIG. 3C is an exemplary conventional (smooth) anisotropy model.
Figure 3D:
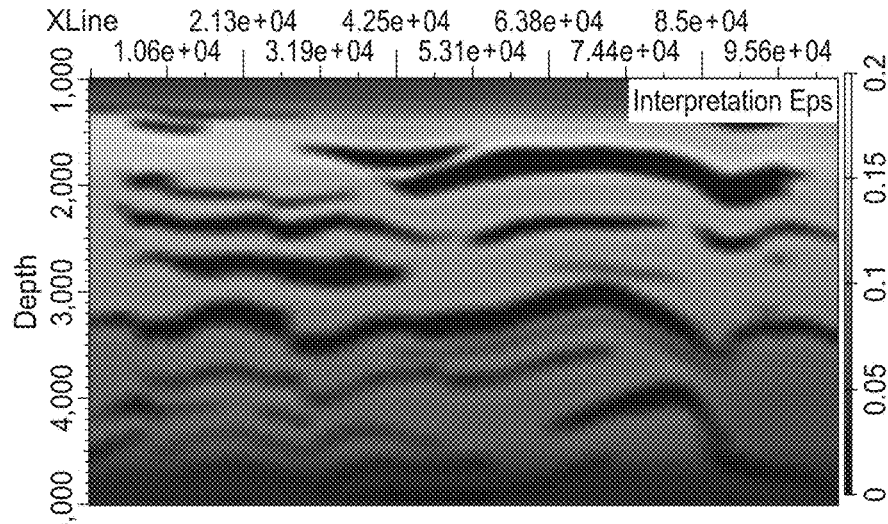
FIG. 3D is an exemplary inhomogeneous anisotropy model modified according to aspects of the present disclosure.
Figure 3E:
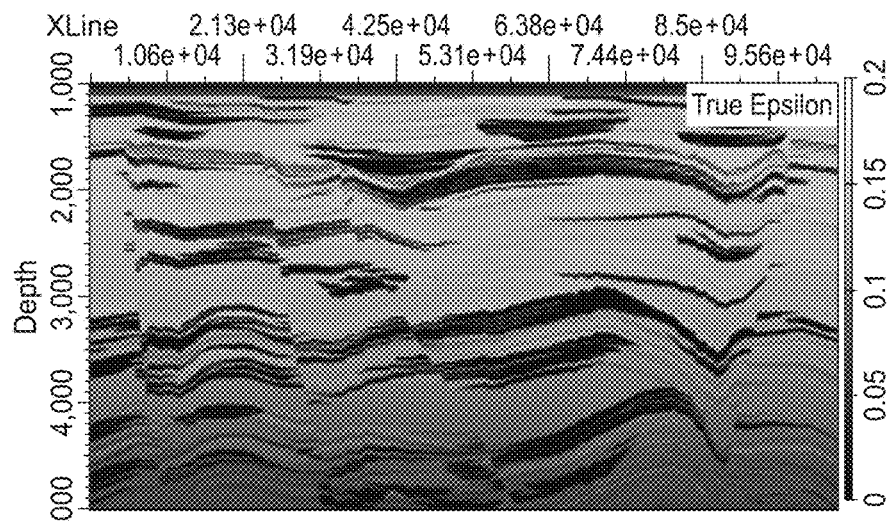
FIG. 3E is the "true" anisotropy model.

A conventional low-frequency imaging anisotropy model is shown in FIG. 3C which, as can be appreciated, is relatively smooth. Using the $V_S/V_P$ model as a shale indicator, the anisotropy model was updated to construct an inhomogeneous anisotropy model as shown in FIG. 3D. For comparison, FIG. 3E shows the true anisotropy mode, which was generated based on the synthetic data.

Figure 3F:
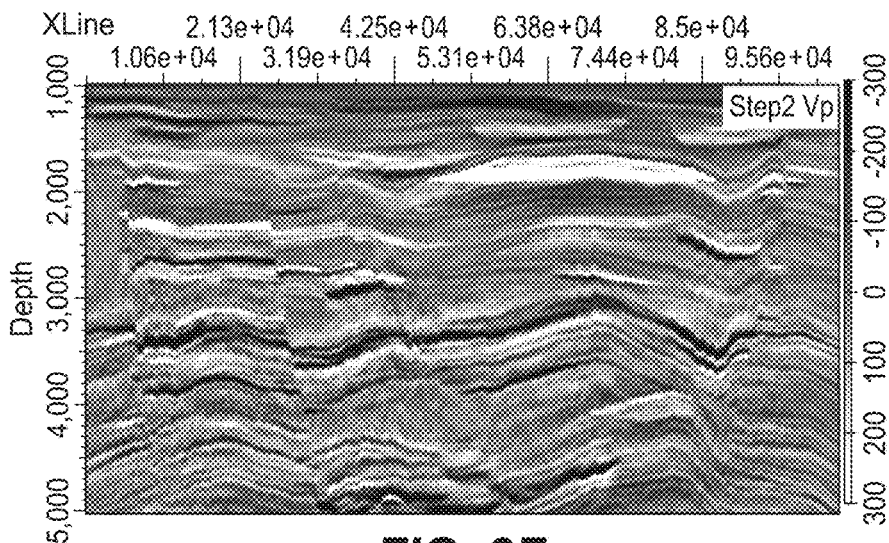
FIG. 3F is the $V_P$ model obtained with elastic FWI using the conventional anisotropy model.
Figure 3G:
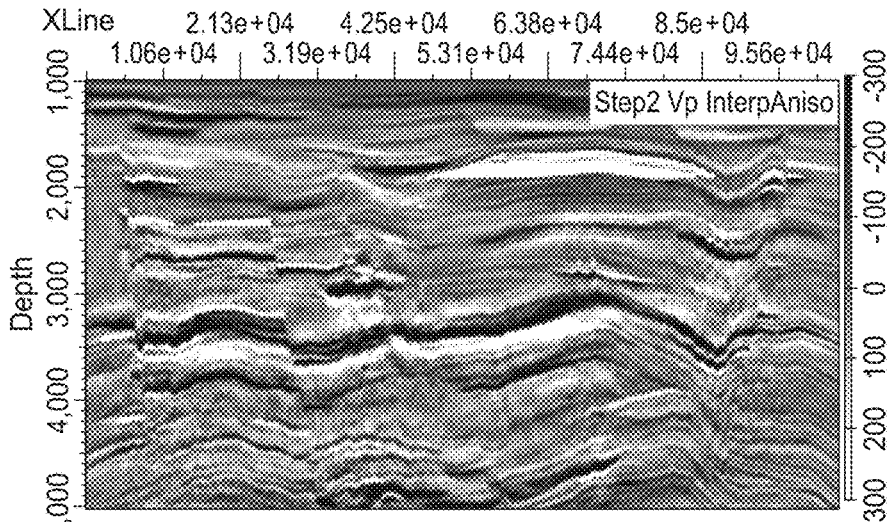
FIG. 3G is the $V_P$ model obtained with elastic FWI using the inhomogeneous anisotropy model.
Figure 3H:
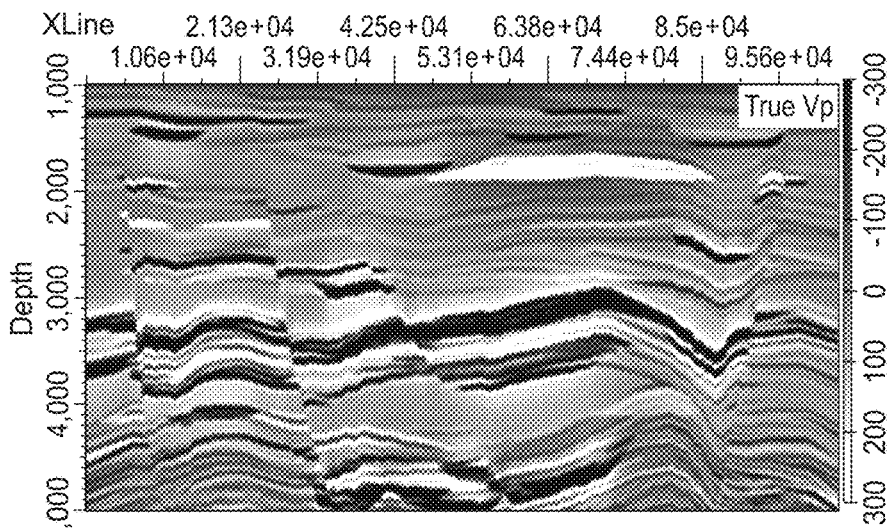
FIG. 3H is the inverted true $V_P$ model.

Next, two $V_P$ models are presented in FIG. 3F and FIG. 3G, both generated through elastic FWI, maintaining the $I_P$ and $V_S/V_P$ models fixed. FIG. 3F shows $V_P$ inverted using the "smooth" anisotropy model of FIG. 3C, while FIG. 3G shows $V_P$ inverted using the modified, inhomogeneous anisotropy model of FIG. 3D. The "true" $V_P$ profile used to generate the synthetic data is provided in FIG. 3H. It can be appreciated that the $V_P$ model obtained using an inhomogeneous anisotropy (FIG. 3G) model exhibits better resolution and is much closer to the true $V_P$ profile of FIG. 3H than the $V_P$ model generated using a conventional (smooth) anisotropy model (FIG. 3F).

Figure 4:
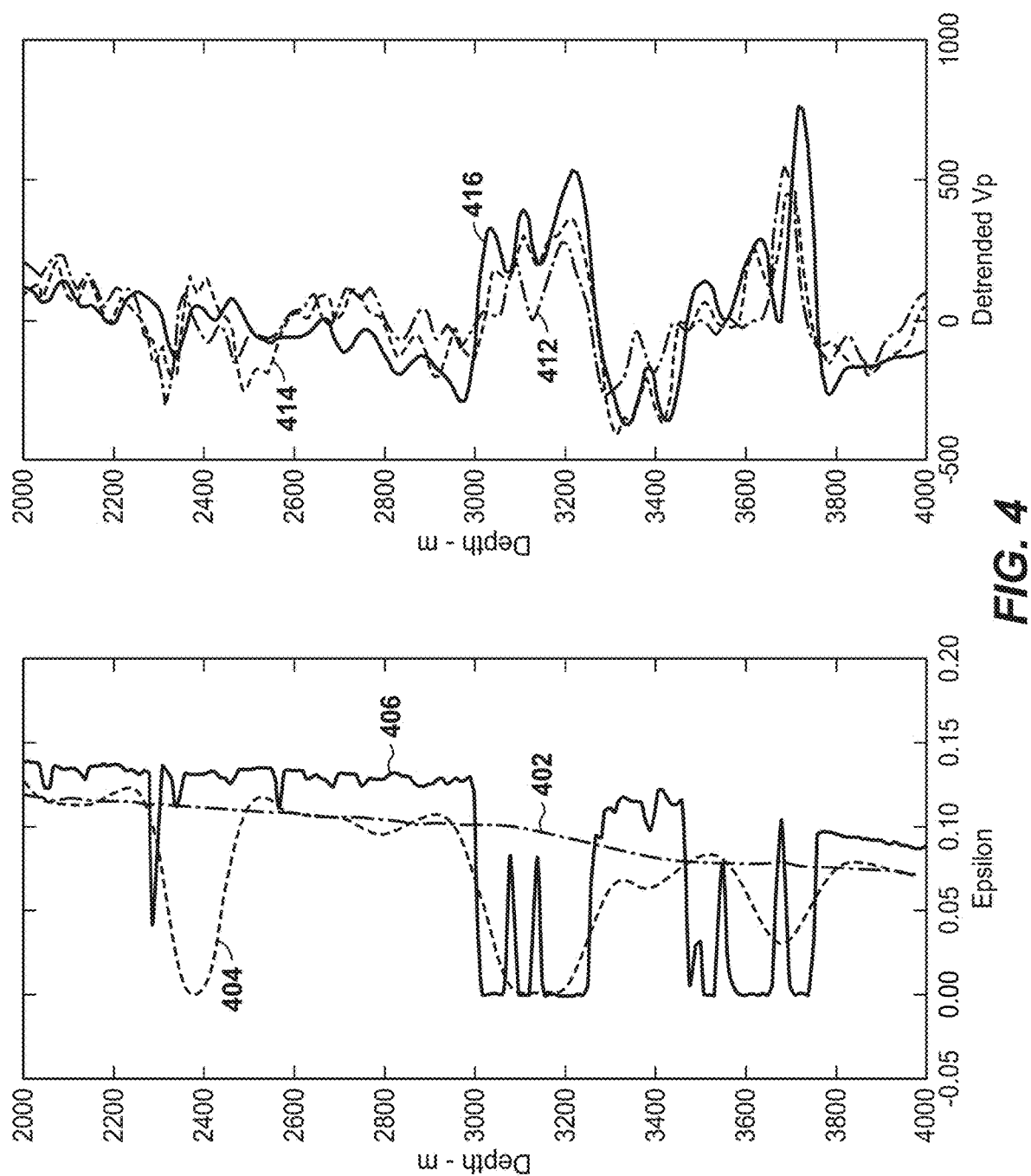
FIG. 4 is an exemplary well log comparison of $V_P$ obtained with and without using a modified, inhomogeneous anisotropy model according to aspects of the present disclosure.

In particular, improved magnitude and conformance to structure can be obtained in the class 2/2P areas (below 2,500 m). For example, FIG. 4 shows a well log comparison of $V_P$ obtained with and without using a modified, inhomogeneous anisotropy model according to aspects of the present disclosure, at the location of a class 2P reservoir. Line 402 corresponds to the conventional (unmodified) c model, line 404 to the c model updated as described herein (inhomogeneous anisotropy), and line 406 to the "true" c model. Corresponding inverted $V_P$ models (after detrending) 412, 414, and 416 were generated using the conventional c model, modified c model, and the true c model, respectively. The curve 416 represents the true $V_P$ property, which must be predicted as accurately as possible to obtain reliable reservoir characterization. It can be appreciated that the detrended $V_P$ model 412 using the conventional anisotropy model under-predicts the reservoir $V_P$ magnitude and over-predicts the $V_P$ magnitude in the shale above and below, curve 416. However, the detrended $V_P$ curve 414 resulting from use of a high resolution anisotropy model shows improved prediction in both reservoir and the shale section above and below the reservoir.

Figure 5:
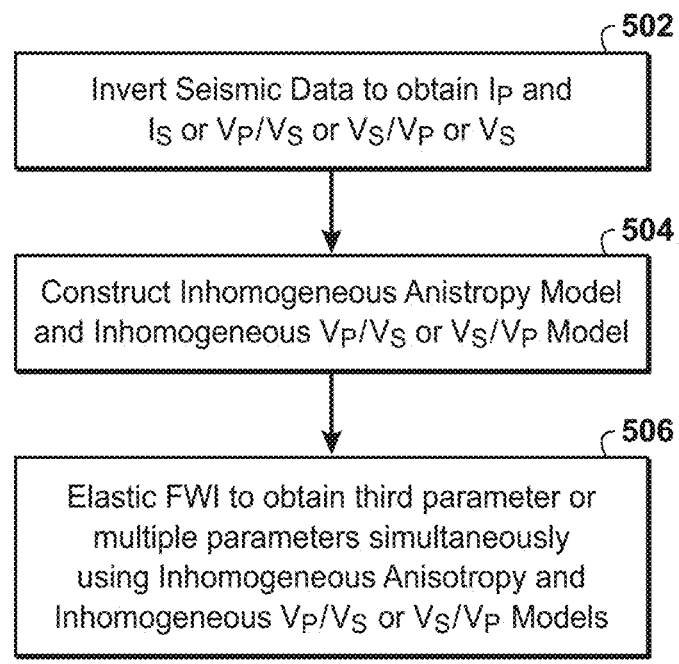
FIG. 5 is a flow chart showing basic steps in another embodiment of seismic processing methods according to the present disclosure.

With reference to FIG. 5, another embodiment of methods according to the present disclosure is shown. Similar to the method illustrated in FIG. 2, the method of FIG. 5 may begin at step 502 by inverting seismic data up to conventional far angles (i.e., up to about 40°-45°) using conventional migration or elastic FWI to infer $I_P$ and at least one of $I_S$, $V_P/V_S$, $V_S/V_P$, and $V_S$. At step 504, an inhomogeneous anisotropy model and an inhomogeneous $V_P/V_S$ or $V_S/V_P$ model are constructed, using the methodology of interpreted geobodies (as in step 204). It should be understood that this step envisions constructing the inhomogeneous anisotropy model before, after, or simultaneously with the inhomogeneous $V_P/V_S$ or $V_S/V_P$ model. For example, an inhomogeneous anisotropy model may be constructed as described in step 204, and for constructing an inhomogeneous $V_S/V_P$ model, a thresholding function and/or direct mapping from seismic stacks and/or previous elastic FWI products $I_P$ and $V_S/V_P$ (produced in step 502) can be used to set areas corresponding to shale at lower $V_S/V_P$ values and areas corresponding to sand at higher $V_S/V_P$ values. As with the embodiment illustrated in FIG. 2, step 502 is optional and the inhomogeneous anisotropy and $V_P/V_S$ or $V_S/V_P$ models may be constructed on the basis of seismic facies analysis or regional geologic knowledge alone, for example.

The refined inhomogeneous $V_P/V_S$ or $V_S/V_P$ and anisotropy models are used at step 506 to obtain a third parameter via elastic FWI or simultaneously invert for multiple parameters. For example, the far-offset range of seismic data may be inverted for ρ, using an elastic inversion algorithm, with $I_P$ and $V_P/V_S$ fixed. $V_P$ may then be computed from $I_P$ using the definition of acoustic impedance and ρ as determined in 502. Or the far-offset range may be inverted for $V_P$, using an elastic inversion algorithm, with $I_P$ and $V_P/V_S$ fixed. Density ρ may then be computed from $I_P$ using the definition of acoustic impedance and $V_P$ as determined may be determined in 502. Persons of ordinary skill in the art will recognize that variations of a sequential or simultaneous elastic FWI approach may be performed at step 506 while holding the updated $V_P/V_S$ or $V_S/V_P$ model fixed.

Figure 6A:
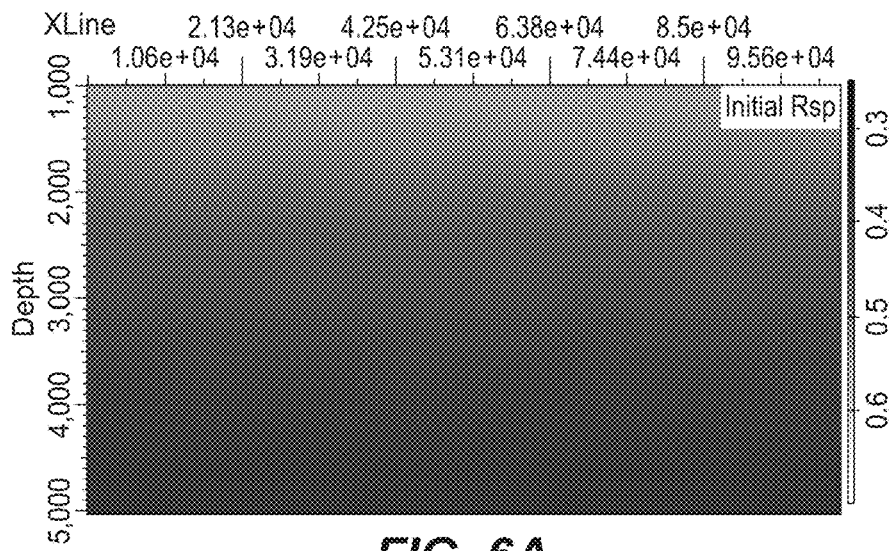
FIG. 6A is an exemplary conventional $V_S/V_P$ model.
Figure 6B:
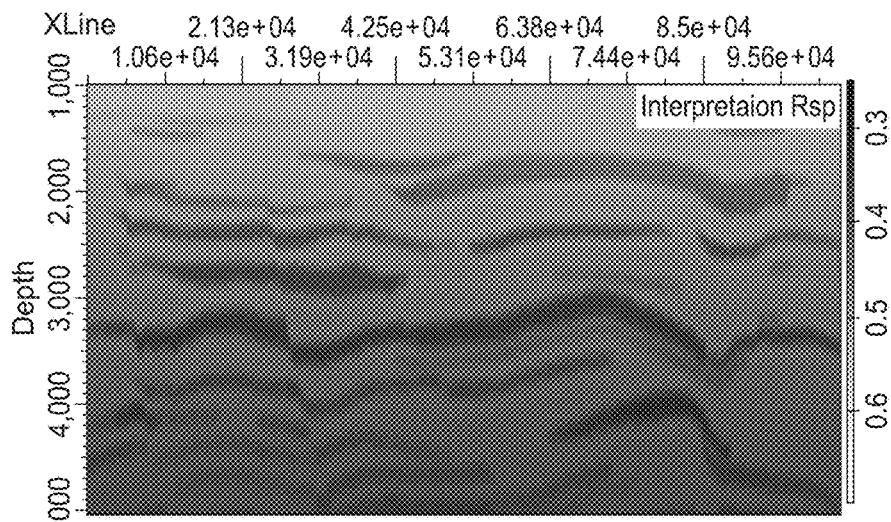
FIG. 6B is an exemplary inhomogeneous $V_S/V_P$ modified according to aspects of the present disclosure.
Figure 6C:
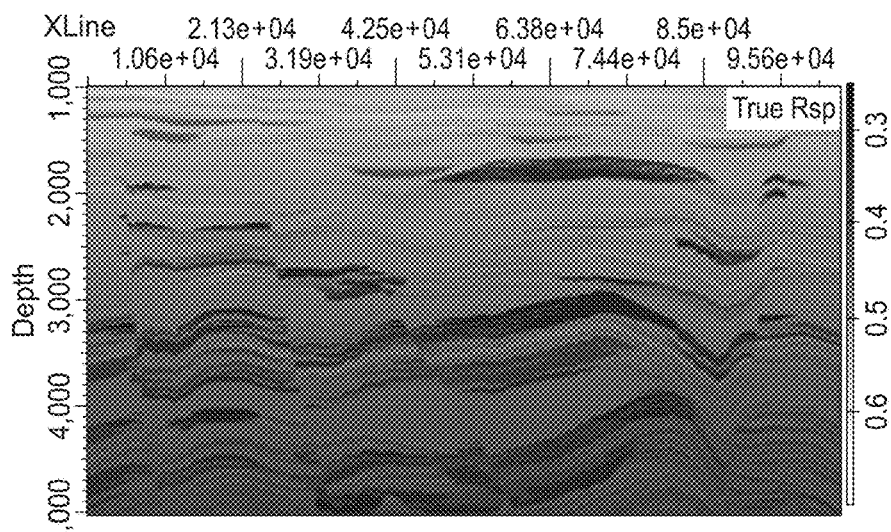
FIG. 6C is the "true" $V_S/V_P$ model.
Figure 6D:
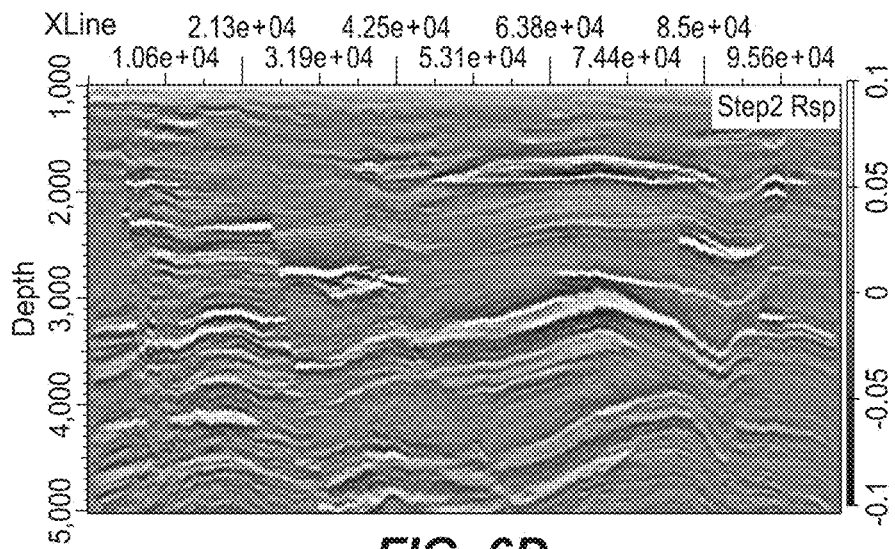
FIG. 6D is the inverted $V_S/V_P$ model obtained with elastic FWI using the conventional (smooth) $V_S/V_P$ model.
Figure 6E:
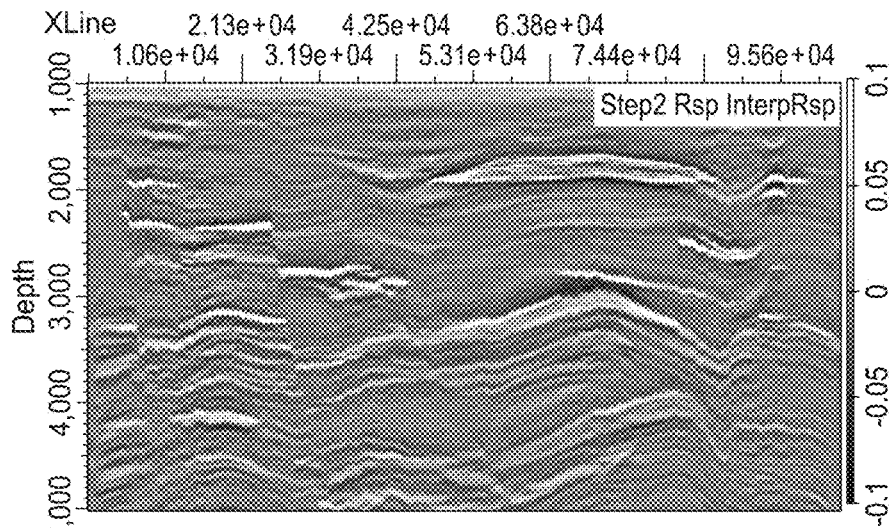
FIG. 6E is the inverted $V_S/V_P$ model obtained with elastic FWI using the inhomogeneous $V_S/V_P$ model and an inhomogeneous anisotropy model (not shown)
Figure 6F:
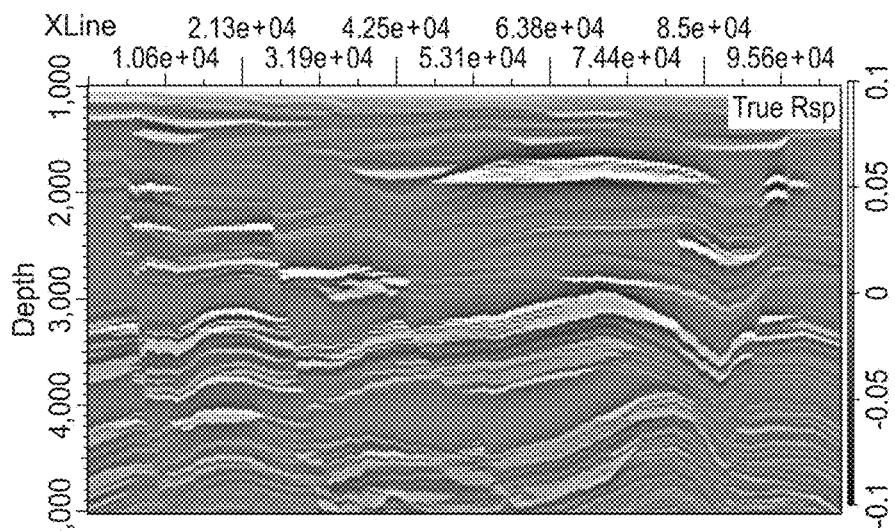
FIG. 6F is the inverted true $V_S/V_P$ model.

To illustrate some advantages of the method of FIG. 5, an example is provided in FIGS. 6A-6F. In particular, FIG. 6A shows an initial (smooth) $V_S/V_P$ model, and FIG. 6D shows its corresponding inverted $V_S/V_P$ model. For comparison, FIG. 6B shows an inhomogeneous $V_S/V_P$ model refined using methodologies described herein. For simplicity, in this example the inhomogeneous anisotropy model constructed in the previous example (FIG. 3D) was used together with the updated $V_S/V_P$ model shown in FIG. 6B to conduct elastic FWI to invert for $V_S/V_P$ as shown in FIG. 6E. The "true" $V_S/V_P$ model reflecting the effect of geological differences is provided in FIG. 6C, and its inverted counterpart in FIG. 6F. It is evident that the inverted $V_S/V_P$ model obtained by using inhomogeneous anisotropy and inhomogeneous $V_S/V_P$ models according to methods described herein more closely matches the true answer.

Figure 7:
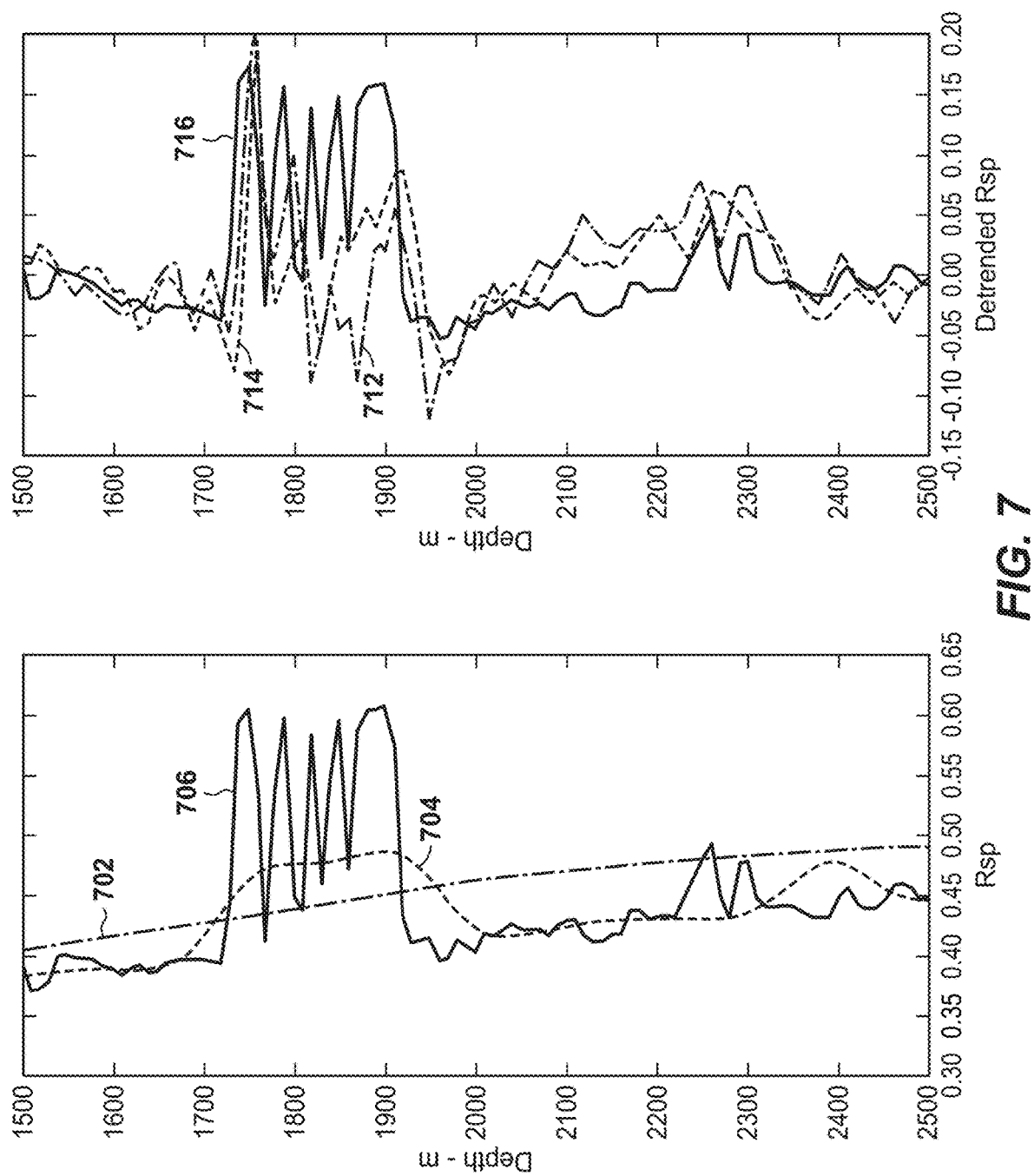
FIG. 7 is an exemplary well log comparison of $V_S/V_P$ obtained with and without using a modified, inhomogeneous $V_S/V_P$ model according to aspects of the present disclosure.

FIG. 7 shows the comparison of $V_S/V_P$ models and inverted $V_S/V_P$ models (after detrending) as well-logs. In particular, line 702 corresponds to the conventional (unmodified) $V_S/V_P$ model, line 704 to the updated $V_S/V_P$ model, and line 706 to the "true" $V_S/V_P$ model. Corresponding inverted $V_S/V_P$ models after detrending 712, 714, and 716 were generated using the conventional $V_S/V_P$ model, modified $V_S/V_P$ model (inhomogeneous) and the true $V_S/V_P$ model, respectively. It can be appreciated that the inverted $V_S/V_P$ model 712 using the homogeneous $V_S/V_P$ model under-predicts the reservoir $V_S/V_P$ magnitude and over-predicts the $V_S/V_P$ magnitude in the shale above and below, curve 716. However, the curve 714, which results from use of a high resolution anisotropy and $V_S/V_P$ models, shows improved prediction in both reservoir and the shale section above and below the reservoir. Since FWI works at seismic resolution, the velocity models obtained using elastic FWI have much higher resolution than conventional velocity models obtained from imaging. Improved, high-frequency information about the subsurface velocity models is not only useful for kinematic imaging to produce improved stacks, but it can also bring additional geological insight to help with interpretation.

Figure 8:
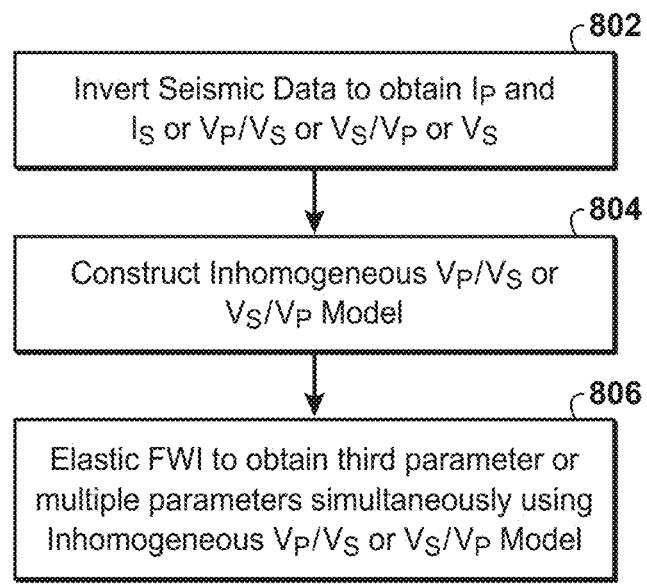
FIG. 8 is a flow chart showing basic steps in another embodiment of seismic processing methods according to the present disclosure.

According to some other aspects of the present disclosure, a third embodiment is contemplated in which only the background $V_P/V_S$ or $V_S/V_P$ model is updated to create an inhomogeneous $V_P/V_S$ or $V_S/V_P$ model. Specifically, as shown in FIG. 8, alternative methods may begin at step 802 by inverting seismic data up to conventional far angles (i.e., up to about) 40°-45° using conventional migration or elastic FWI to infer $I_P$ and at least one of $I_S$, $V_P/V_S$, $V_S/V_P$, and $V_S$. At step 804, an inhomogeneous $V_P/V_S$ or $V_S/V_P$ model is constructed using the methodology of interpreted geobodies (as in step 504). For example, a thresholding function and/or direct mapping from seismic stacks and/or previous elastic FWI products $I_P$ and $V_S/V_P$ can be used to set areas corresponding to shale at lower $V_S/V_P$ values and areas corresponding to sand at higher $V_S/V_P$ values. The refined inhomogeneous $V_P/V_S$ or $V_S/V_P$ model may then be used at step 806 to obtain a third parameter via elastic FWI or simultaneously invert for multiple parameters.

Updated physical property models may be used to prospect for hydrocarbons or otherwise be used in hydrocarbon management. As used herein, hydrocarbon management includes hydrocarbon extraction, hydrocarbon production, hydrocarbon exploration, identifying potential hydrocarbon-bearing formations, characterizing hydrocarbon-bearing to formations, identifying well locations, determining well injection rates, determining well extraction rates, identifying reservoir connectivity, acquiring, disposing of and/or abandoning hydrocarbon resources, reviewing prior hydrocarbon management decisions, and any other hydrocarbon-related acts or activities. For, example, prospecting can include causing a well to be drilled that targets a hydrocarbon deposit derived from a subsurface image generated from the updated model.

Figure 9:
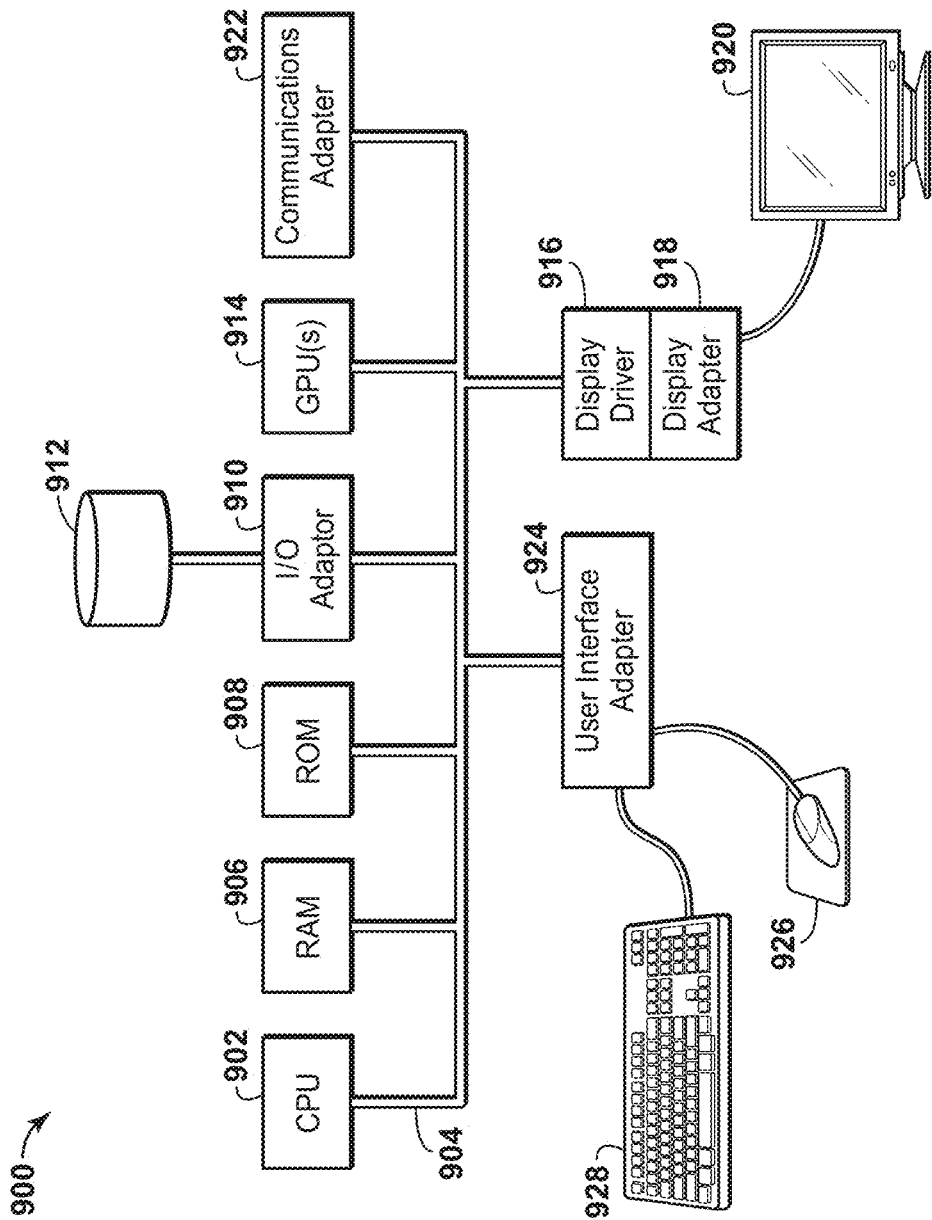
FIG. 9 is a diagram of an exemplary computer system that may be utilized to implement aspects of the present disclosure.

In all practical applications, the present technological advancement must be used in conjunction with a computer, programmed in accordance with the disclosures herein. For example, FIG. 9 is a diagram of an exemplary computer system 900 that may be utilized to implement methods described herein. A central processing unit (CPU) 902 is coupled to system bus 904. The CPU 902 may be any general-purpose CPU, although other types of architectures of CPU 902 (or other components of exemplary system 900) may be used as long as CPU 902 (and other components of system 900) supports the operations as described herein. Those of ordinary skill in the art will appreciate that, while only a single CPU 902 is shown in FIG. 9, additional CPUs may be present. Moreover, the computer system 900 may comprise a networked, multi-processor computer system that may include a hybrid parallel CPU/GPU system. The CPU 902 may execute the various logical instructions according to various teachings disclosed herein. For example, the CPU 902 may execute machine-level instructions for performing processing according to the operational flow described.

The computer system 900 may also include computer components such as non-transitory, computer-readable media. Examples of computer-readable media include a random access memory (RAM) 906, which may be SRAM, DRAM, SDRAM, or the like. The computer system 900 may also include additional non-transitory, computer-readable media such as a read-only memory (ROM) 908, which may be PROM, EPROM, EEPROM, or the like. RAM 906 and ROM 908 hold user and system data and programs, as is known in the art. The computer system 900 may also include an input/output (I/O) adapter 910, a graphics processing unit (GPU) 914, a communications adapter 922, a user interface adapter 924, a display driver 916, and a display adapter 918.

The I/O adapter 910 may connect additional non-transitory, computer-readable media such as a storage device(s) 912, including, for example, a hard drive, a compact disc (CD) drive, a floppy disk drive, a tape drive, and the like to computer system 900. The storage device(s) may be used when RAM 906 is insufficient for the memory requirements associated with storing data for operations of the present techniques. The data storage of the computer system 900 may be used for storing information and/or other data used or generated as disclosed herein. For example, storage device(s) 912 may be used to store configuration information or additional plug-ins in accordance with the present techniques. Further, user interface adapter 924 couples user input devices, such as a keyboard 928, a pointing device 926 and/or output devices to the computer system 900. The display adapter 918 is driven by the CPU 902 to control the display on a display device 920 to, for example, present information to the user such as subsurface images generated according to methods described herein.

The architecture of system 900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 900 may include various plug-ins and library files. Input data may additionally include configuration information.

Preferably, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

Disclosed aspects may include any combinations of the methods and systems shown in the following numbered paragraphs. This is not to be considered a complete listing of all possible aspects, as any number of variations can be envisioned from the description above.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

REFERENCES

The following references are incorporated herein in their entirety in all jurisdictions that allow it:

Aki, Keiiti, and Paul G Richards. *Quantitative Seismology: Theory and Methods*, Chapter 5.20, W.H. Freeman (1980).

Baumstein, A, et al. "Proceedings." *Simultaneous Source Elastic Inversion of Surface Waves*, EAGE Publications BV (2011).

Downton, J, et al. "Methods and systems for performing azimuthal simultaneous elastic inversion," U.S. Patent Pub. 2011/0222370A1 (2011).

Hampson, D P, "Simultaneous inversion of pre-stack seismic data." *SEG Technical Program Expanded Abstracts* 2005, SEG 2005:1633 (2012).

Krebs, Jerome R, et al. "Fast Full-Wavefield Seismic Inversion Using Encoded Sources." *Geophysics*, vol. 74, no. 6, p. 188 (2009).

Krebs, Jerome R, et al. "Iterative inversion of data from simultaneous geophysical sources." U.S. Pat. No. 9,495,487 (2016).

Routh, P, et al. "Convergence rate of Full Wavefield Inversion (FWI) using spectral shaping." U.S. Pat. No. 8,892,413 (2014).

Routh, P, et al. "Simultaneous inversion for source wavelet and AVO parameters from prestack seismic data." U.S. Pat. No. 7,072,767 (2006).

Sears, T. J., et al. et al. "Elastic Full Waveform Inversion of Multi-Component OBC Seismic Data." Geophysical Prospecting, vol. 56, no. 6, 2008, pp. 843-862.

Minkoff, S E, and W W Symes. "Estimating the Energy Source and Reflectivity by Seismic Inversion." *Inverse Problems*, vol. 11, no. 2, 1995, pp. 383-395.

Mora, Peter. "Elastic Wave-Field Inversion of Reflection and Transmission Data." *Geophysics*, vol. 53, no. 6, 1988, pp. 750-759.

Operto, S, et al. "A Guided Tour of Multiparameter Full-Waveform Inversion with Multicomponent Data: From Theory to Practice." *The Leading Edge*, vol. 32, no. 9, 2013, pp. 1040-1054.

Prieux, V, et al. "Multiparameter Full Waveform Inversion of Multicomponent Ocean-Bottom-Cable Data from the Valhall Field. Part 2: Imaging Compressive-Wave and Shear-Wave Velocities." *Geophysical Journal International*, vol. 194, no. 3, 2013, pp. 1665-1681.

Rutherford, Steven R, and Robert H Williams "Amplitude-versus-Offset Variations in Gas Sands." *Geophysics*, vol. 54, no. 6, 1989, pp. 680-688.

Tarantola A. "Inversion of Seismic Reflection Data in the Acoustic Approximation." *Geophysics*, vol. 49, no. 8, 1984, pp. 1259-1266.

Tarantola, Albert. "Theoretical Background for the Inversion of Seismic Waveforms Including Elasticity and Attenuation." *Pure and Applied Geophysics: Pageoph*, vol. 128, no. 1-2, 1988, pp. 365-399.

Virieux, J, and S Operto. "Full-Waveform Inversion—an Overview of Full-Waveform Inversion in Exploration Geophysics." *Geophysics*, vol. 74, no. 6, 2009, p. 1.

Wang, K, et al. "Multi-parameter inversion through offset dependent elastic FWI." U.S. Pat. No. 9,702,993 (2017).

What is claimed is:

1. A method for prospecting for hydrocarbons using inversion of seismic data to infer subsurface physical property parameters comprising:
   constructing an inhomogeneous anisotropy model;
   inverting the seismic data in a sequential or simultaneous approach to obtain at least one subsurface physical property parameter using an elastic inversion algorithm and the inhomogeneous anisotropy model; and
   wherein the subsurface physical property parameters comprise P-wave velocity $V_P$, S-wave velocity $V_s$, density, and combinations thereof;
   identifying potential hydrocarbon-bearing formations in a subsurface region based on the physical property parameter; and
   causing a well to be drilled that targets the potential hydrocarbon-bearing formations.

2. The method of claim 1, wherein using an elastic inversion algorithm comprises:
   extracting only PP mode data from the seismic data;
   inverting the PP mode data sequentially in two or more different offset ranges, each offset range inversion determining P-wave impedance ($I_p$) and at least one of S-wave impedance ($I_s$), P-wave velocity over S-wave velocity ($V_p/V_s$), S-wave velocity over P-wave velocity ($V_s/V_p$), and S-wave velocity ($V_s$), wherein in a second and subsequent inversions, parameters determined in a previous inversion are held fixed; and
   using the inverted subsurface physical property parameters to construct the inhomogeneous anisotropy model.

3. The method of claim 2, wherein a near-offset range is sequentially first to be inverted to infer $I_P$, using a computer programmed with an acoustic or elastic inversion algorithm.

4. The method of claim 3, wherein a mid-offset range is sequentially second to be inverted to infer at least one of $I_s$, $V_p/V_s$, $V_s/V_p$, and $V_s$, with $I_P$ fixed at its value from the first inversion, said second inversion using an elastic inversion algorithm.

5. The method of claim 4, wherein inverting the seismic data is performed in a sequential approach comprising:
   inverting a far-offset range to infer density or $V_P$, using an elastic inversion algorithm, with $I_P$ fixed at its value from the inversion of the near-offset range and $I_P$ or $V_p/V_S$ or $V_s/V_p$ or $V_S$ fixed at its value from the inversion of the mid-offset range.

6. The method of claim 5, wherein density ρ is inferred, and further comprising:
   computing $V_P$ from the relationship $I_P = \rho V_P$ using $I_P$ and the inferred density.

7. The method of claim 5, wherein $V_P$ is inferred, and further comprising:
   computing density ρ from the relationship $I_P = \rho V_P$ using $I_P$ and the inferred $V_P$.

8. The method of claim 5, further comprising repeating the inversions of the near-offset data, mid-offset data, and far-offset data at least one time to update the inferred physical property parameters.

9. The method of claim 4, wherein the acoustic and elastic inversion algorithms are full waveform inversion algorithms.

10. The method of claim 1, wherein constructing the inhomogeneous anisotropy model comprises:
    deriving geobodies from at least one of seismic facies analysis, regional geologic information, or seismically derived earth models; and
    adjusting at least one of the elastic stiffness tensor matrix in a homogeneous anisotropy model in areas corresponding to the geobodies.

11. The method of claim 10, wherein the geobodies are sand geobodies.

12. A method for prospecting for hydrocarbons using inversion of seismic data to infer subsurface physical property parameters comprising:
    constructing an inhomogeneous anisotropy model and an inhomogeneous $V_S/V_P$ or $V_P/V_S$ model;
    inverting the seismic data in a sequential or simultaneous approach to obtain at least one subsurface physical property parameter using an elastic inversion algorithm and the inhomogeneous anisotropy model and the inhomogeneous $V_S/V_P$ or $V_P/V_S$ model;
    wherein the subsurface physical property parameters comprise P-wave velocity $V_P$, S-wave velocity $V_S$, density, lambda, mu, and combinations thereof;
    identifying potential hydrocarbon-bearing formations in a subsurface region based on the physical property parameter; and
    causing a well to be drilled that targets the potential hydrocarbon-bearing formations.

13. The method of claim 12, wherein using an elastic inversion algorithm comprises:
    extracting only PP mode data from the seismic data;
    inverting the PP mode data sequentially in two or more different offset ranges, each offset range inversion determining P-wave impedance ($I_P$) and at least one of S-wave impedance ($I_S$), P-wave velocity over S-wave velocity ($V_P/V_S$), S-wave velocity over P-wave velocity ($V_S/V_P$), and S-wave velocity ($V_S$), wherein in a second and subsequent inversions, parameters determined in a previous inversion are held fixed; and
    using the inverted subsurface physical property parameters to construct the inhomogeneous anisotropy model and the inhomogeneous $V_S/V_P$ or $V_P/V_S$ model.

14. The method of claim 13, wherein a near-offset range is sequentially first to be inverted to infer $I_P$, using a computer programmed with an acoustic or elastic inversion algorithm.

15. The method of claim 14, wherein a mid-offset range is sequentially second to be inverted to infer at least one of $I_S$, $V_P/V_S$, $V_S/V_P$, and $V_S$, with $I_P$ fixed at its value from the first inversion, said second inversion using an elastic inversion algorithm.

16. The method of claim 15, wherein inverting the seismic data is performed in a sequential approach comprising:

inverting a far-offset range to infer density or $V_P$, using an elastic inversion algorithm, with $I_P$ fixed at its value from the inversion of the near-offset range and $I_P$ or $V_P/V_S$ or $V_S/V_P$ or $V_S$ fixed at its value from the inversion of the mid-offset range.

17. The method of claim 16, wherein density ρ is inferred, and further comprising:
computing $V_P$ from the relationship $I_P=\rho V_P$ using $I_P$ and the inferred density.

18. The method of claim 16, wherein $V_P$ is inferred, and further comprising:
computing density ρ from the relationship $I_P=\rho V_P$ using $I_P$ and the inferred $V_P$.

19. The method of claim 16, further comprising repeating the inversions of the near-offset data, mid-offset data, and far-offset data at least one time to update the inferred physical property parameters.

20. The method of claim 15, wherein the acoustic and elastic inversion algorithms are full waveform inversion algorithms.

21. The method of claim 12, wherein constructing the inhomogeneous anisotropy model comprises:
deriving geobodies from at least one of seismic facies analysis, regional geologic information, or seismically derived earth models; and
adjusting parameters of the elastic stiffness tensor matrix in a homogeneous anisotropy model in areas corresponding to the geobodies.

22. The method of claim 21, wherein the geobodies are sand geobodies.

23. The method of claim 12, wherein constructing the inhomogeneous $V_S/V_P$ or $V_P/V_S$ to model comprises:
deriving geobodies from at least one of seismic facies analysis, regional geologic information, or seismically derived earth models; and
adjusting values in a homogeneous $V_S/V_P$ or $V_P/V_S$ model in areas corresponding to the geobodies.

24. The method of claim 23, wherein the geobodies are sand geobodies, and areas corresponding to sand are assigned lower $V_P/V_S$ values if constructing a $V_P/V_S$ model or assigned higher $V_S/V_P$ values if constructing a $V_S/V_P$ model.

25. A method for prospecting for hydrocarbons using inversion of seismic data to infer subsurface physical property parameters comprising:
constructing an inhomogeneous $V_S/V_P$ or $V_P/V_S$ model;
inverting the seismic data in a sequential or simultaneous approach to obtain at least one subsurface physical property parameter using an elastic inversion algorithm and the inhomogeneous $V_S/V_P$ or $V_P/V_S$ model;
wherein the subsurface physical property parameters comprise P-wave velocity $V_P$, S-wave velocity $V_S$, density, lambda, mu, and combinations thereof;
identifying potential hydrocarbon-bearing formations in a subsurface region based on the physical property parameter; and
causing a well to be drilled that targets the potential hydrocarbon-bearing formations.

26. The method of claim 25, wherein using an elastic inversion algorithm comprises:
extracting only PP mode data from the seismic data;
inverting the PP mode data sequentially in two or more different offset ranges, each offset range inversion determining P-wave impedance ($I_P$) and at least one of S-wave impedance ($I_S$), P-wave velocity over S-wave velocity ($V_P V_S$), S-wave velocity over P-wave velocity ($V_S/V_P$), and S-wave velocity ($V_S$), wherein in a second and subsequent inversions, parameters determined in a previous inversion are held fixed; and
using the inverted subsurface physical property parameters to construct the inhomogeneous $V_S/V_P$ or $V_P/V_S$ model.

27. The method of claim 26, wherein a near-offset range is sequentially first to be inverted to infer $I_P$, using a computer programmed with an acoustic or elastic inversion algorithm.

28. The method of claim 27, wherein a mid-offset range is sequentially second to be inverted to infer at least one of $I_S$, $V_P/V_S$, $V_S/V_P$, and $V_S$, with $I_P$ fixed at its value from the first inversion, said second inversion using an elastic inversion algorithm.

29. The method of claim 28, wherein inverting the seismic data is performed in a sequential approach comprising:
inverting a far-offset range to infer density or $V_P$, using an elastic inversion algorithm, with $I_P$ fixed at its value from the inversion of the near-offset range and $I_P$ or $V_P/V_S$ or $V_S/V_P$ or $V_S$ fixed at its value from the inversion of the mid-offset range.

30. The method of claim 29, wherein density ρ is inferred, and further comprising:
computing $V_P$ from the relationship $I_P=\rho V_P$ using $I_P$ and the inferred density.

31. The method of claim 29, wherein $V_P$ is inferred, and further comprising:
computing density ρ from the relationship $I_P=\rho V_P$ using $I_P$ and the inferred $V_P$.

32. The method of claim 29, further comprising repeating the inversions of the near-offset data, mid-offset data, and far-offset data at least one time to update the inferred physical property parameters.

33. The method of claim 28, wherein the acoustic and elastic inversion algorithms are full waveform inversion algorithms.

34. The method of claim 25, wherein constructing the inhomogeneous $V_S/V_P$ or $V_P/V_S$ model comprises:
deriving geobodies from at least one of seismic facies analysis, regional geologic information, or seismically derived earth models; and
adjusting values in a homogeneous $V_S/V_P$ or $V_P/V_S$ model in areas corresponding to the geobodies.

35. The method of claim 34, wherein the geobodies are sand geobodies, and areas corresponding to sand are assigned lower $V_P/V_S$ values if constructing a $V_P/V_S$ model or assigned higher $V_S/V_P$ values if constructing a $V_S/V_P$ model.

\* \* \* \* \*